US008296459B1

(12) United States Patent
Brandwine et al.

(10) Patent No.: US 8,296,459 B1
(45) Date of Patent: *Oct. 23, 2012

(54) CUSTOM ROUTING DECISIONS

(75) Inventors: Eric Jason Brandwine, Haymarket, VA (US); Swaminathan Sivasubramanian, Seattle, WA (US); Bradley E. Marshall, Bainbridge Island, WA (US); Tate Andrew Certain, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 150 days.

This patent is subject to a terminal disclaimer.

(21) Appl. No.: 12/827,268

(22) Filed: Jun. 30, 2010

(51) Int. Cl.
*G06F 15/16* (2006.01)
*G06F 11/30* (2006.01)

(52) U.S. Cl. ........ 709/241; 709/245; 709/223; 709/238; 370/399; 370/400; 370/229; 370/235; 370/231; 370/449

(58) Field of Classification Search .................. 709/241, 709/225, 244, 224, 220, 206, 227
See application file for complete search history.

(56) References Cited

U.S. PATENT DOCUMENTS

| | | | | |
|---|---|---|---|---|
| 7,991,859 | B1* | 8/2011 | Miller et al. ................ | 709/220 |
| 2005/0053034 | A1* | 3/2005 | Chiueh ....................... | 370/331 |
| 2007/0118879 | A1 | 5/2007 | Yeun | |
| 2010/0246443 | A1* | 9/2010 | Cohn et al. .................. | 370/255 |
| 2011/0022711 | A1* | 1/2011 | Cohn ........................... | 709/225 |

OTHER PUBLICATIONS

Counter Hack Reloaded A Step-By-Step Guide to Computer Attacks and Effective Defenses, Second Edition, Ed Skoudis, et al., dated Nov. 2006, pp. 59-66.
How the Net works: An Introduction to Peering and Transit; Rudolph van der Berg; dated Sep. 2, 2008.
VL2: A Scalable and Flexible Data Center Network; Albert Greenberg, et al.; dated Aug. 2009.
Cisco Policy Based Routing White Paper; accessed Jun. 7, 2010.
Internet Security Systems, Distributed Denial of Service Attack Tools; accessed Jun. 7, 2010.
B. Pfaff, et al., Extending Networking into the Virtualization Layer, Proceedings of the 8$^{th}$ ACM Workshop on Hot Topics in Networks (HotNets—VIII), New York City, New York (Oct. 2009).
Towards A Next Generation Data Center Architecture: Scalability and Commoditization; Albert Greenberg, et al.; dated Aug. 22, 2008.
U.S. Appl. No. 12/827,398, filed Jun. 30, 2010, Brandwine et al.

* cited by examiner

*Primary Examiner* — Jude Jean Gilles
(74) *Attorney, Agent, or Firm* — Knobbe Martens Olson & Bear LLP

(57) ABSTRACT

With the advent of virtualization technologies, networks and routing for those networks can now be simulated using commodity hardware rather than actual routers. For example, virtualization technologies such as those provided by VMWare, XEN, or User-Mode Linux can be adapted to allow a single physical computing machine to be shared among multiple virtual networks by providing each virtual network user with one or more virtual machines hosted by the single physical computing machine, with each such virtual machine being a software simulation acting as a distinct logical computing system that provides users with the illusion that they are the sole operators and administrators of a given hardware computing resource. In addition, routing can be accomplished through software, providing additional routing flexibility to the virtual network in comparison with traditional routing. As a result, in some implementations, supplemental information other than packet information can be used to determine network routing.

28 Claims, 8 Drawing Sheets

CUSTOM ROUTING DECISIONS

BACKGROUND

Generally described, computing devices utilize a communication network, or a series of communication networks, to exchange data. In a common scenario, data to be exchanged is divided into a series of packets that can be transmitted between a sending computing device and a recipient computing device. In general, each packet can be considered to include two primary components, namely, control information and payload data. The control information corresponds to information utilized by one or more communication networks to deliver the payload data. For example, control information can include source and destination network addresses, error detection codes, packet sequencing identification, and the like. Typically, control information is found in packet headers and trailers included within the packet and adjacent to the payload data.

In practice, in a packet-switched communication network, packets are transmitted between multiple physical networks, or sub-networks. Generally, the physical networks include a number of hardware devices that receive packets from a source network component and forward the packet to a recipient network component. The packet routing hardware devices are typically referred to as routers. Generally described, routers can operate with two primary functions or planes. The first function corresponds to a control plane, in which the router learns the set of outgoing interfaces that are most appropriate for forwarding received packets to specific destinations. The second function is a forwarding plane, in which the router sends the received packet to an outbound interface.

To execute the forwarding plane functionality, routers can maintain a forwarding information base ("FIB") that identifies, among other packet attribute information, destination information for at least a subset of possible network addresses, such as Internet Protocol ("IP") addresses. In a typical embodiment, the FIB corresponds to a table of values specifying network forwarding information for the router. Meanwhile, to execute control plane functionality, routers can maintain a routing information base ("RIB") that identifies routes through the network. The RIB can also contain metrics associated with those routes. As the router receives route updates, the router can update the RIB with announced or withdrawn routes. Generally, where the RIB identifies available routes, the FIB identifies an output interface corresponding to a selected route and the FIB is typically generated from information in the RIB.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

With the advent of virtualization technologies, networks and routing for those networks can now be simulated using commodity hardware rather than actual routers. For example, virtualization technologies can be adapted to allow a single physical computing machine to be shared among multiple virtual networks by hosting one or more virtual machines on the single physical computing machine. Each such virtual machine can be a software simulation acting as a distinct logical computing system that provides users with the illusion that they are the sole operators and administrators of a given hardware computing resource. In addition, as routing can be accomplished through software, additional routing flexibility can be provided to the virtual network in comparison with traditional routing. As a result, in some implementations, supplemental information other than packet information can be used to determine network routing.

In this disclosure, techniques are described for providing logical networking functionality for managed computer networks, such as for virtual computer networks that are provided on behalf of users or other entities. In at least some embodiments, the techniques enable a user to configure or specify a network topology, routing costs, and/or routing paths for a virtual or overlay computer network including logical networking devices that are each associated with a specified group of multiple physical computing nodes. With the network configuration specified for a virtual computer network, the functionally and operation of the virtual network can be simulated on physical computing nodes operating virtualization technologies. In some embodiments, multiple users or entities (e.g. businesses or other organizations) can access the system as tenants of the system, each having their own virtual network in the system. In one embodiment, a user's access and/or network traffic is transparent to other users. For example, even though physical components of a network may be shared, a user of a virtual network may not see another user's network traffic on another virtual network if monitoring traffic on the virtual network.

Figure 1:
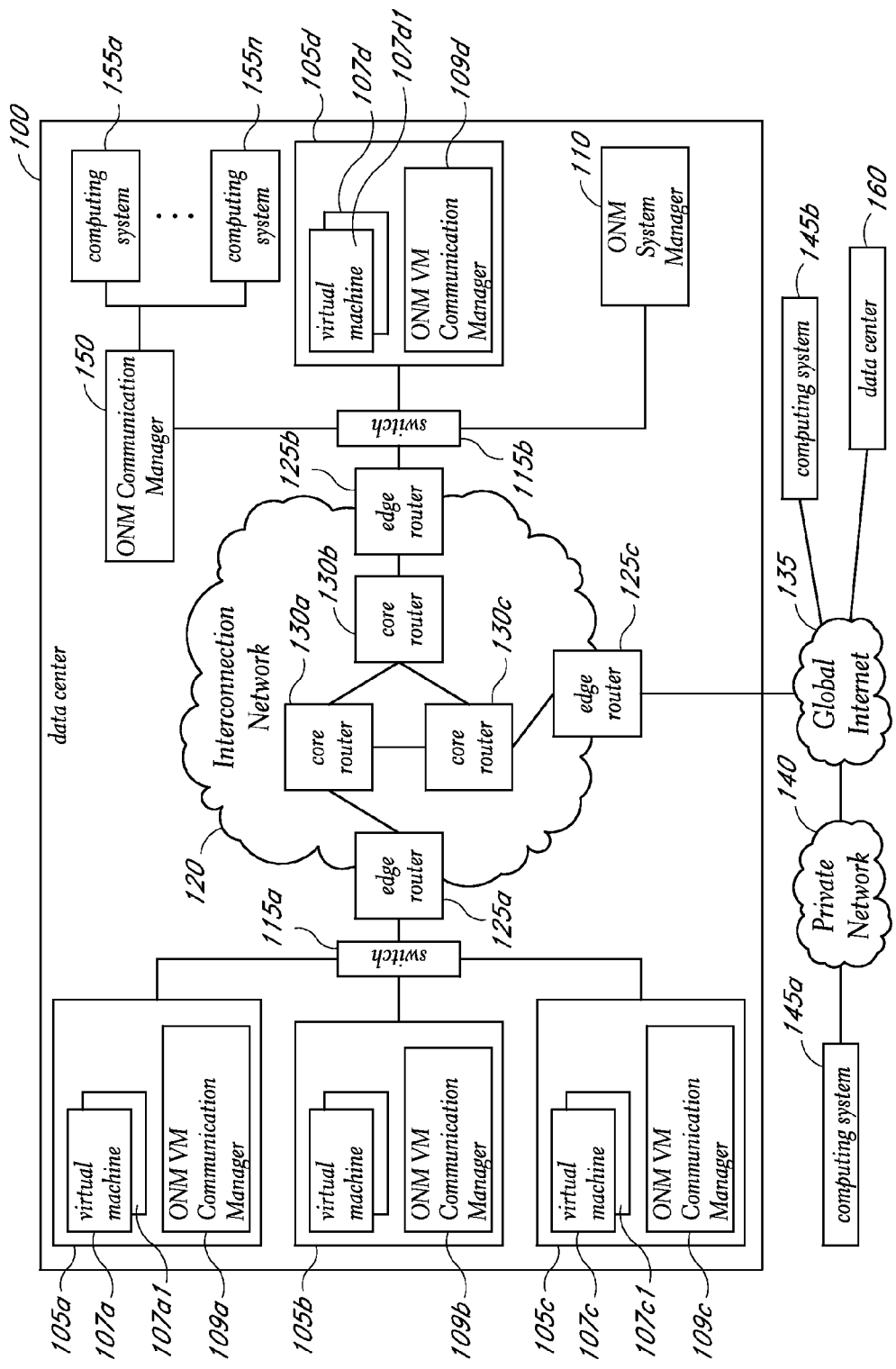
FIG. 1 is a network diagram illustrating an embodiment of an overlay network manager (ONM) system for managing computing nodes associated with a virtual computer network.
Figure 2:
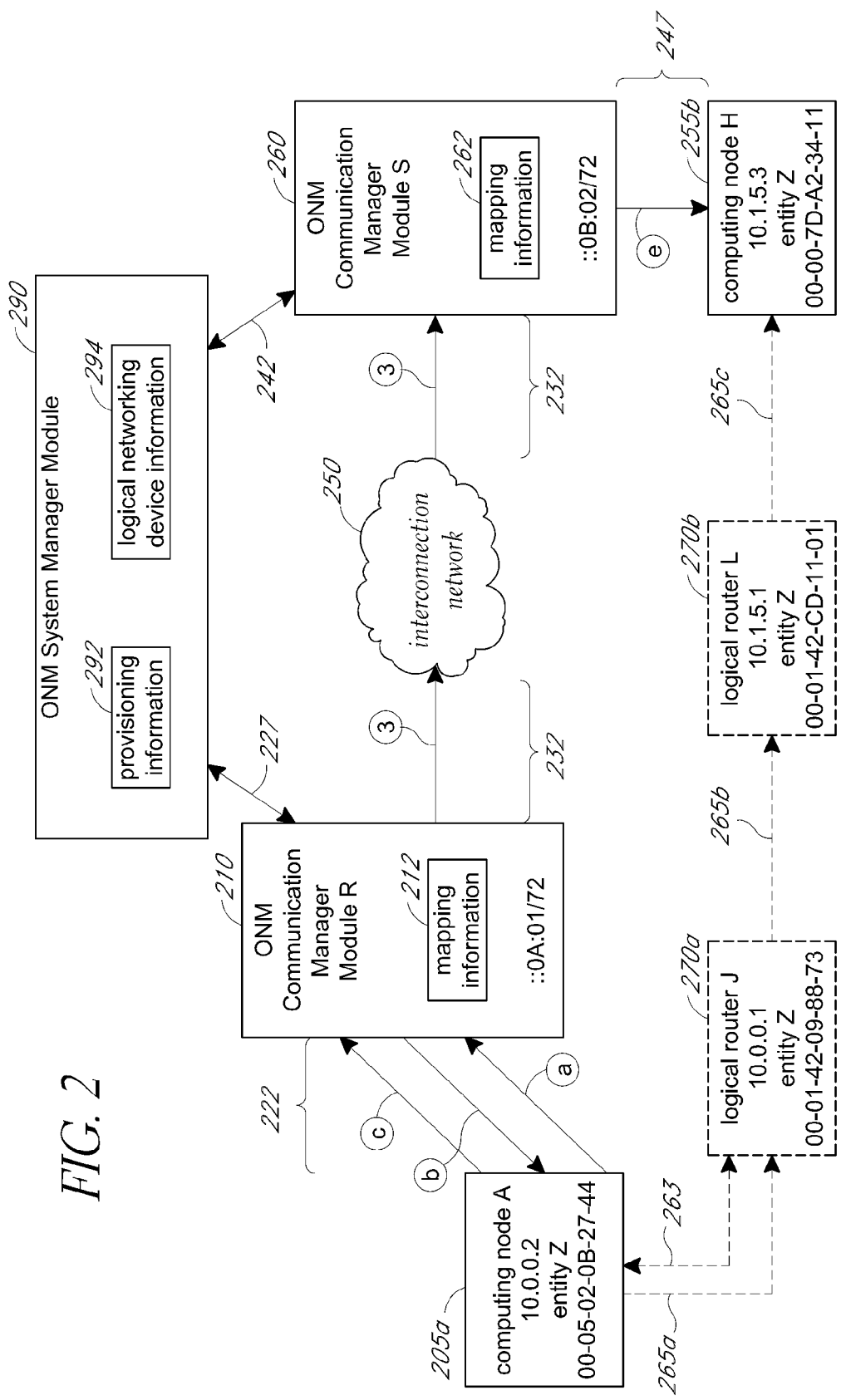
FIG. 2 illustrates a more detailed implementation of the ONM system of FIG. 1 supporting logical networking functionality.

By way of overview, FIGS. 1 and 2 discuss embodiments where communications between multiple computing nodes of the virtual computer network emulate functionality that would be provided by logical networking devices if they were physically present. In some embodiments, some or all of the emulation are performed by an overlay network manager system. FIGS. 2-4B and 7B discuss embodiments where substrate routing decisions can be made independently of any simulated routing in the overlay network, allowing, for example, optimization of traffic on the substrate network based on information unavailable to a virtual network user. FIGS. 5A-7A discuss embodiments where routing decisions implemented on the virtual or overlay network are propagated to the substrate network. Thus, a user can specify cost functions for the overlay network that can be used to make routing decisions in the substrate network.

Overlay Network Manager

FIG. 1 is a network diagram illustrating an embodiment of an overlay network manager system (ONM) for managing computing nodes associated with a virtual computer network. Virtual network communications can be overlaid on one or more intermediate physical networks in a manner transparent to the computing nodes. In this example, the ONM system includes a system manager module 110 and multiple communication manager modules 109a, 109b, 109c, 109d, 150 to facilitate the configuring and managing communications on the virtual computer network.

The illustrated example includes an example data center 100 with multiple physical computing systems operated on behalf of the ONM system. The example data center 100 is connected to a global internet 135 external to the data center 100. The global internet can provide access to one or more computing systems 145a via private network 140, to one or more other globally accessible data centers 160 that each have multiple computing systems, and to one or more other computing systems 145b. The global internet 135 can be a publicly accessible network of networks, such as the Internet, and the 1private network 140 can be an organization's network that is wholly or partially inaccessible from computing systems external to the private network 140. Computing systems 145b can be home computing systems or mobile computing devices that each connects directly to the global internet 135 (e.g., via a telephone line, cable modem, a Digital Subscriber Line ("DSL"), cellular network or other wireless connection, etc.).

The example data center 100 includes a number of physical computing systems 105a-105d and 155a-155n, as well as a Communication Manager module 150 that executes on one or more other computing systems to manage communications for the associated computing systems 155a-155n. The example data center further includes a System Manager module 110 that executes on one or more computing systems. In this example, each physical computing system 105a-105d hosts multiple virtual machine computing nodes and includes an associated virtual machine ("VM") communication manager module (e.g., as part of a virtual machine hypervisor monitor for the physical computing system). Such VM communications manager modules and VM computing nodes include VM Communication Manager module 109a and virtual machines 107a on host computing system 105a, and VM Communication Manager module 109d and virtual machines 107d on host computing system 105d. Physical computing systems 155a-155n do not execute any virtual machines in this example, and thus can each act as a computing node that directly executes one or more software programs on behalf of a user. The Communication Manager module 150 that manages communications for the associated computing systems 155a-155n can have various forms, such as, for example, a proxy computing device, firewall device, or networking device (e.g., a switch, router, hub, etc.) through which communications to and from the physical computing systems travel. In other embodiments, all or none of the physical computing systems at the data center host virtual machines.

This example data center 100 further includes multiple physical networking devices, such as switches 115a-115b, edge router devices 125a-125c, and core router devices 130a-130c. Switch 115a is part of a physical sub-network that includes physical computing systems 105a-105c, and is connected to edge router 125a. Switch 115b is part of a distinct physical sub-network that includes physical computing systems 105d and 155a-155n, as well as the computing systems providing the Communication Manager module 150 and the System Manager module 110, and is connected to edge router 125b. The physical sub-networks established by switches 115a-115b, in turn, are connected to each other and other networks (e.g., the global internet 135) via an intermediate interconnection network 120, which includes the edge routers 125a-125c and the core routers 130a-130c. The edge routers 125a-125c provide gateways between two or more sub-networks or networks. For example, edge router 125a provides a gateway between the physical sub-network established by switch 115a and the interconnection network 120, while edge router 125c provides a gateway between the interconnection network 120 and global internet 135. The core routers 130a-130c manage communications within the interconnection network 120, such as by routing or otherwise forwarding packets or other data transmissions as appropriate based on characteristics of such data transmissions (e.g., header information including source and/or destination addresses, protocol identifiers, etc.) and/or the characteristics of the interconnection network 120 itself (e.g., routes based on the physical network topology, etc.).

The System Manager module 110 and Communication Manager modules 109, 150 can configure, authorize, and otherwise manage communications between associated computing nodes, including providing logical networking functionality for one or more virtual computer networks that are provided using the computing nodes. For example, Communication Manager module 109a and 109c manages associated virtual machine computing nodes 107a and 107c and each of the other Communication Manager modules can similarly manage communications for a group of one or more other associated computing nodes. The Communication Manager modules can configure communications between computing nodes so as to overlay a virtual network over one or more intermediate physical networks that are used as a substrate network, such as over the interconnection network 120.

Furthermore, a particular virtual network can optionally be extended beyond the data center 100, such as to one or more other data centers 160 which can be at geographical locations distinct from the first data center 100. Such data centers or other geographical locations of computing nodes can be interconnected in various manners, including via one or more public networks, via a private connection such as a direct or VPN connection, or the like. In addition, such data centers can each include one or more other Communication Manager modules that manage communications for computing systems at that data. In some embodiments, a central Communication Manager module can coordinate and manage communications among multiple data centers.

Thus, as one illustrative example, one of the virtual machine computing nodes 107a1 on computing system 105a can be part of the same virtual local computer network as one of the virtual machine computing nodes 107d1 on computing system 105d. The virtual machine 107a1 can then direct an outgoing communication to the destination virtual machine computing node 107d1, such as by specifying a virtual network address for that destination virtual machine computing node. The Communication Manager module 109a receives the outgoing communication, and in at least some embodiments determines whether to authorize the sending of the outgoing communication. By filtering unauthorized communications to computing nodes, network isolation and security of entities' virtual computer networks can be enhanced.

The Communication Manager module 109a can determine the actual physical network location corresponding to the destination virtual network address for the communication. For example, the Communication Manager module 109a can determine the actual destination network address by dynamically interacting with the System Manager module 110, or can have previously determined and stored that information. The Communication Manager module 109a then re-headers or otherwise modifies the outgoing communication so that it is directed to Communication Manager module 109d using an actual substrate network address.

When Communication Manager module 109d receives the communication via the interconnection network 120, it obtains the virtual destination network address for the communication (e.g., by extracting the virtual destination network address from the communication), and determines to which virtual machine computing nodes 107d the communication is directed. The Communication Manager module 109d then re-headers or otherwise modifies the incoming communication so that it is directed to the destination virtual machine computing node 107d1 using an appropriate virtual network address for the virtual computer network, such as by using the sending virtual machine computing node 107a1's virtual network address as the source network address and by using the destination virtual machine computing node 107d1's virtual network address as the destination network address. The Communication Manager module 109d then forwards the modified communication to the destination virtual machine computing node 107d1. In at least some embodiments, before forwarding the incoming communication to the destination virtual machine, the Communication Manager module 109d can also perform additional steps related to security.

Further, the Communication Manager modules 109a and/or 109c on the host computing systems 105a and 105c can perform additional actions that correspond to one or more logical specified router devices lying between computing nodes 107a1 and 107c1 in the virtual network topology. For example, the source computing node 107a1 can direct a packet to a logical router local to computing node 107a1 (e.g., by including a virtual hardware address for the logical router in the packet header), with that first logical router being expected to forward the packet to the destination node 107c1 via the specified logical network topology. The source Communication Manager module 109a receives or intercepts the packet for the logical first router device and can emulate functionality of some or all of the logical router devices in the network topology, such as by modifying a TTL ("time to live") hop value for the communication, modifying a virtual destination hardware address, and/or otherwise modify the communication header. Alternatively, some or all the emulation functionality can be performed by the destination Communication Manager module 109c after it receives the packet.

By providing logical networking functionality, the ONM system provides various benefits. For example, because the various Communication Manager modules manage the overlay virtual network and can emulate the functionality of logical networking devices, in certain embodiments specified networking devices do not need to be physically implemented to provide virtual computer networks, allowing greater flexibility in the design of virtual user networks. Additionally, corresponding modifications to the interconnection network 120 or switches 115a-115b are generally not needed to support particular configured network topologies. Nonetheless, a particular network topology for the virtual computer network can be transparently provided to the computing nodes and software programs of a virtual computer network.

Logical/Virtual Networking

FIG. 2 illustrates a more detailed implementation of the ONM system of FIG. 1 supporting logical networking functionality. The ONM system includes more detailed embodiments of the ONM System Manager and ONM Communication Manager of FIG. 1. In FIG. 2, computing node A is sending a communication to computing node H, and the actions of the physically implemented modules 210 and 260 and devices of network 250 in actually sending the communication are shown, as well as emulated actions of the logical router devices 270a and 270b in logically sending the communication.

In this example, computing nodes A 205a and H 255b are part of a single virtual computer network for entity Z. However, computing nodes can be configured to be part of two distinct sub-networks of the virtual computer network and the logical router devices 270a and 270b separate the computing nodes A and H in the virtual network topology. For example, logical router device J 270a can be a local router device to computing node A and logical router device L 270b can be a local router device to computing node H.

In FIG. 2, computing nodes A 205a and H 255b includes hardware addresses associated with those computing nodes for the virtual computer network, such as virtual hardware addresses that are assigned to the computing nodes by the System Manager module 290 and/or the Communication Manager modules R 210 and S 260. In this example, computing node A has been assigned hardware address "00-05-02-0B-27-44," and computing node H has been assigned hardware address "00-00-7D-A2-34-11." In addition, the logical router devices J and L have also each been assigned hardware addresses, which in this example are "00-01-42-09-88-73" and "00-01-42-CD-11-01," respectively, as well as virtual network addresses, which in this example are "10.0.0.1" and "10.1.5.1," respectively. The System Manager module 290 maintains provisioning information 292 that identifies where each computing node is actually located and to which entity and/or virtual computer network the computing node belongs.

In this example, computing node A 205a first sends an address resolution protocol (ARP) message request 222-a for virtual hardware address information, where the message is expected to first pass through a logical device J before being forwarded to computing node H. Accordingly, the ARP message request 222-a includes the virtual network address for logical router J (e.g., "10.0.0.1") and requests the corresponding hardware address for logical router J.

Communication Manager module R intercepts the ARP request 222-a, and obtains a hardware address to provide to computing node A as part of spoofed ARP response message 222-b. The Communication Manager module R can determine the hardware address by, for example, looking up various hardware address information in stored mapping information 212, which can cache information about previously received communications. Communication Manager module R can communicate 227 with the System Manager module 290 to translate the virtual network address for logical router J.

The System Manager module 290 can maintain information 294 related to the topology and/or components of virtual computer networks and provide that information to Communication Manager modules. The Communication Manager module R can then store the received information as part of mapping information 212 for future use. Communication Manager module R then provides computing node A with the hardware address corresponding to logical router J as part of response message 222-b. While request 222-a and response message 222-b actually physically pass between computing node A and Communication Manager module R, from the standpoint of computing node A, its interactions occur with local router device J.

After receiving the response message 222-b, computing node A 205a creates and initiates the sending of a communication 222-*c* to computing node H 255*b*. From the standpoint of computing node A, the sent communication will be handled as if logical router J 270*a* were physically implemented. For example, logical router J could modify the header of the communication 265*a* and forward the modified communication 265*b* to logical router L 270*a*, which would similarly modify the header of the communication 265*b* and forward the modified communication 265*c* to computing node H. However, communication 222-*c* is actually intercepted and handled by Communication Manager module R, which modifies the communication as appropriate, and forwards the modified communication over the interconnection network 250 to computing node H by communication 232-3. Communication Manager module R and/or Communication Manager module S may take further actions in this example to modify the communication from computing node A to computing node H or vice versa to provide logical networking functionality. For example, Communication Manager module S can provides computing node H with the hardware address corresponding to logical router L as part of response message 247-*e* by looking up the hardware address in stored mapping information 262. In one embodiment, a communication manager or computing node encapsulates a packet with another header or label where the additional header specifies the route of the packet. Recipients of the packet can then read the additional header and direct the packet accordingly. A communication manager at the end of the route can remove the additional header.

A user or operator can specify various configuration information for a virtual computer network, such as various network topology information and routing costs associated with the virtual 270*a*, 270*b* and/or substrate network 250. In turn, the ONM System Manager 290 can select various computing nodes for the virtual computer network. In some embodiments, the selection of a computing node can be based at least in part on a geographical and/or network location of the computing node, such as an absolute location or a relative location to a resource (e.g., other computing nodes of the same virtual network, storage resources to be used by the computing node, etc.). In addition, factors used when selecting a computing node can include: constraints related to capabilities of a computing node, such as resource-related criteria (e.g., an amount of memory, an amount of processor usage, an amount of network bandwidth, and/or an amount of disk space), and/or specialized capabilities available only on a subset of available computing nodes; constraints related to costs, such as based on fees or operating costs associated with use of particular computing nodes; or the like.

Route Selection on Substrate Network

Figure 3:
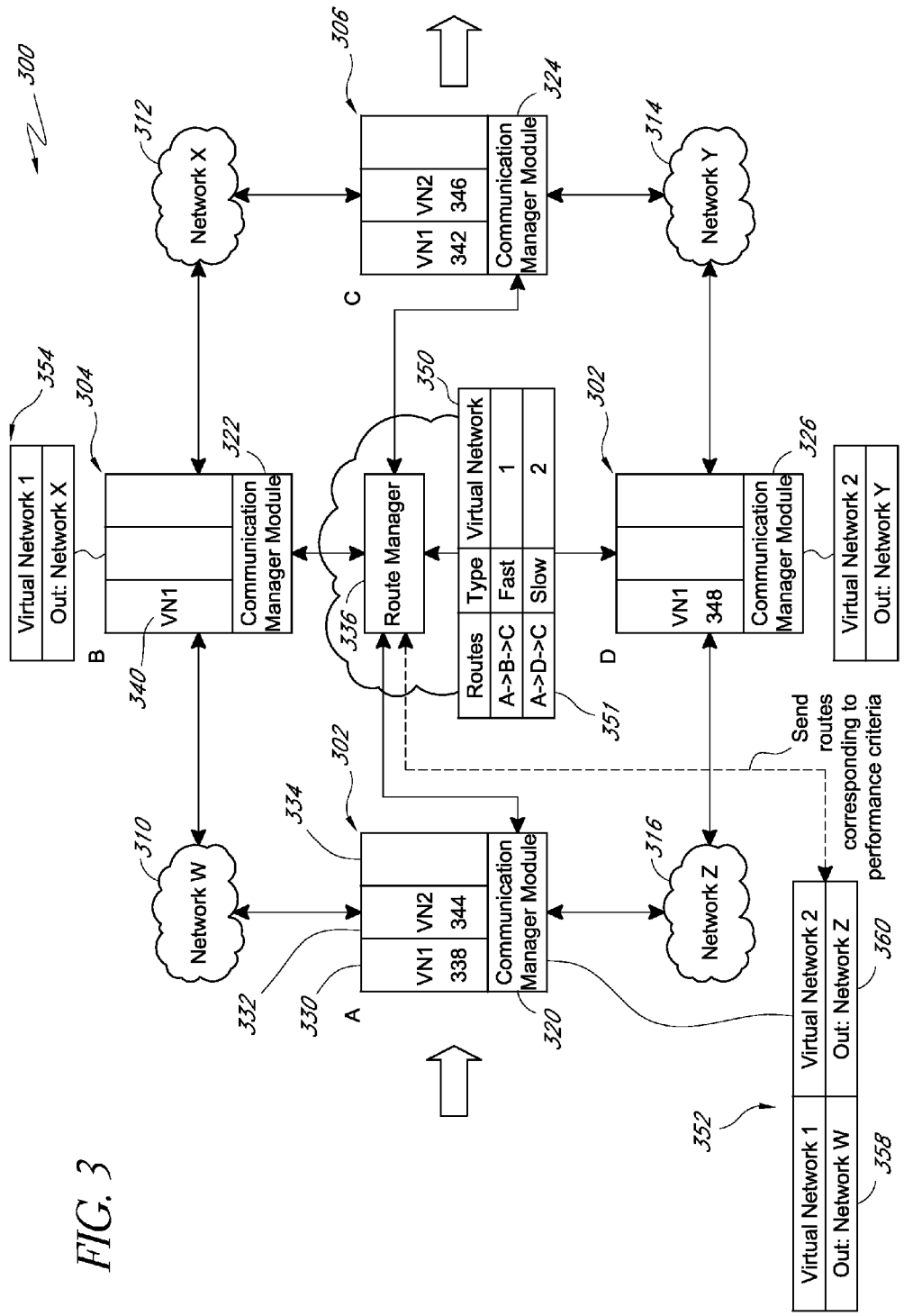
FIG. 3 illustrates an example embodiment of a substrate network configuration having a route manager capable of determining routes for virtual networks.

FIG. 3 illustrates an example embodiment of a substrate network 300 having a route manager 336 capable of determining routes for overlay networks. The substrate network 300 can be composed of one or more substrate components or nodes, such as computing nodes, routing nodes, communication links or the like. In FIG. 3, the substrate network 300 includes computing nodes A 302, B 304, C 306, and D 308, which are capable of simulating various components of one or more associated overlay networks. The nodes can be located on the same data center or in multiple data centers. Computing node A is interconnected to node B via network W 310, node B is connected to node C by network X 312, node C is connected to node D by network Y 314, and node D is connected to node A by network Z 316. Networks W, X, Y, and Z can include one or more physical networking devices, such as routers, switches, or the like, and can include private or public connections. Components shown in FIG. 3, such as the computing nodes and communication manager modules, can implement certain of the features of embodiments described above with respect to FIGS. 1 and 2.

In FIG. 3, nodes A 302, B 304, C 306, and D 308 are associated with a respective Communication Manager module 320, 322, 324, and 326. The communication manager modules can implement certain of the features described in the Communication Manager 150, 210, 260 and VM Communication manager 109*a*, 109*b*, 109*c*, 109*d* of FIGS. 1 and 2. For example, the Communication Manager module 320 for node A can operate on a hypervisor monitor of the computing node and can direct the communication of one or more virtual computing nodes 330, 332, 334 of node A. The computing nodes, communication managers and Route Manager 336 can be part of the same ONM system. In one embodiment, the computing nodes run the XEN operating system (OS) or similar virtualization OS, with the communication managers operating on domain 0 or the first OS instance and the virtual computing nodes being domain U or additional OS instances.

The communication manager modules in FIG. 3 are in communication with a Route Manager module 336, operating on one or more computing devices, that directs routing for the substrate network 300. In one embodiment, the Route Manager operates as part of the ONM System Manager module 110, 290 of FIGS. 1 and 2, with functionally combined into a single module. The Route Manager can be located within a data center or at a regional level and direct traffic between data centers. In one embodiment, multiple Route Managers can operate in a distributed manner to coordinate routing across multiple data centers.

In FIG. 3, two virtual networks are associated with the substrate network 300. Virtual network 1 (VN1) has components 338, 340, 342, associated with virtual computing nodes on computing nodes A 302, B 304, and C 306. Virtual network 2 (VN2) has components 344, 346, 348 associated with virtual computing nodes on nodes A, C, and D 308.

As the Routing Manager module 336 directs network traffic on the substrate network 300, traffic can be directed flexibly and various network configurations and network costs can be considered. For example, routing paths can be determined based on specified performance levels for the virtual networks. In one embodiment, if the user for VN1 is entitled to a higher service level, such as for faster speed (e.g. lower latency and/or higher bandwidth), traffic associated with VN1 can be routed on a "fast" path of the substrate network 300. For example, in one embodiment, traffic for "platinum" users is prioritized over traffic for "gold" and "silver" users, with traffic from "gold" users prioritized over "silver" users. In one embodiment, at least some packets of the user with the higher service level are prioritized over packets of a user with a lower service level, for example, during times of network congestion. The user may be entitled to a higher level because the user has purchased the higher service level or earned the higher service level through good behavior, such as by paying bills, complying with the operator's policies and rules, not overusing the network, combinations of the same, or the like.

The Route Manager 336 can store user information or communicate with a data store containing user information in order to determine the target performance level for a virtual network. The data store can be implemented using databases, flat files, or any other type of computer storage architecture and can include user network configuration, payment data, user history, service levels, and/or the like. Typically, the Route Manager will have access to node and/or link characteristics for the substrate nodes and substrate links collected using various network monitoring technologies or routing protocols. The Route Manager can then select routes that correspond to a selected performance level for the virtual network and send these routes to the computing nodes. For example, network W 310 and Y 312 can be built on fiber optic lines while network Y 314 and Z 316 are built on regular copper wire. The Route Manager can receive network metrics data and determine that the optical lines are faster than the copper wires (or an administrator can designate the optical lines as a faster path). Thus, the Route Manager, in generating a route between node A 302 and node C 306 for "fast" VN1 traffic, would select a path going through network W and Y (e.g., path A-B-C).

In another situation, where the user for VN2 is not entitled to a higher service level, VN2 traffic from node A 302 to node B 306 can be assigned to a "slow" or default path through network Y 314 and Z 316 (e.g. path A-D-C). In order to track routing assignments, the Routing Manager can maintain the routes and/or route association in a data store, such as a Routing Information Base (RIB) or routing table 350. The Route Manager can also track the target performance criteria 351 associated with a particular virtual network.

In order to direct network traffic on the substrate network 300, the Routing Manager 336 can create forwarding entries for one or more of the Communication Manager modules 320, 322, 324, 326 that direct how network traffic is routed by the Communication Manager. The Communication Manager modules can store those entries in forwarding tables 352, 354, 356, or other similar data structure, associated with a Communication Manager. For example, for VN1, the Route Manager can generate a control signal or message, such as a forwarding entry 358, that directs VN1 traffic received or generated on node A 302 through network W 310 (on path A-B-C). Meanwhile, for VN2, the Route Manager can generate a control signal or message, such as a forwarding entry 360, which directs traffic received on node A through network Z. The Route Manager can send these forwarding entries to the node A Communication Manager 320, which can store them on its forwarding table 352. Thus, network traffic associated with VN1 and VN2, destined for node C 306 received or generated on node A can travel by either path A-B-C or path A-D-C based on the designated performance level for VN1 and VN2.

While the example of FIG. 3 depicts only two virtual networks, the Route Manager 336 can similarly generate and maintain routes for any number of virtual networks. Likewise, the substrate network 300 can include any number of computing nodes and/or physical network devices. Routes can be determined based on multiple performance criteria, such as network bandwidth, network security, network latency, and network reliability. For example, traffic for a virtual network suspected of being used for spamming (e.g. mass advertisement emailing) can be routed through network filters and scanners in order to reduce spam.

Figure 4A:
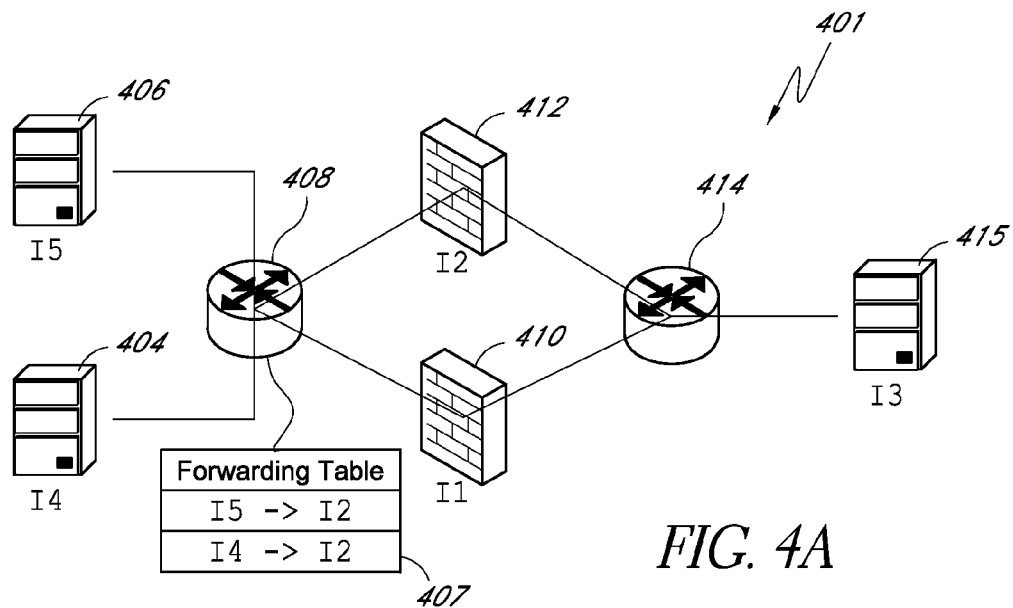
FIGS. 4A and 4B illustrate a virtual network and corresponding substrate network where substrate routing is independently determined from virtual routing.
Figure 4B:
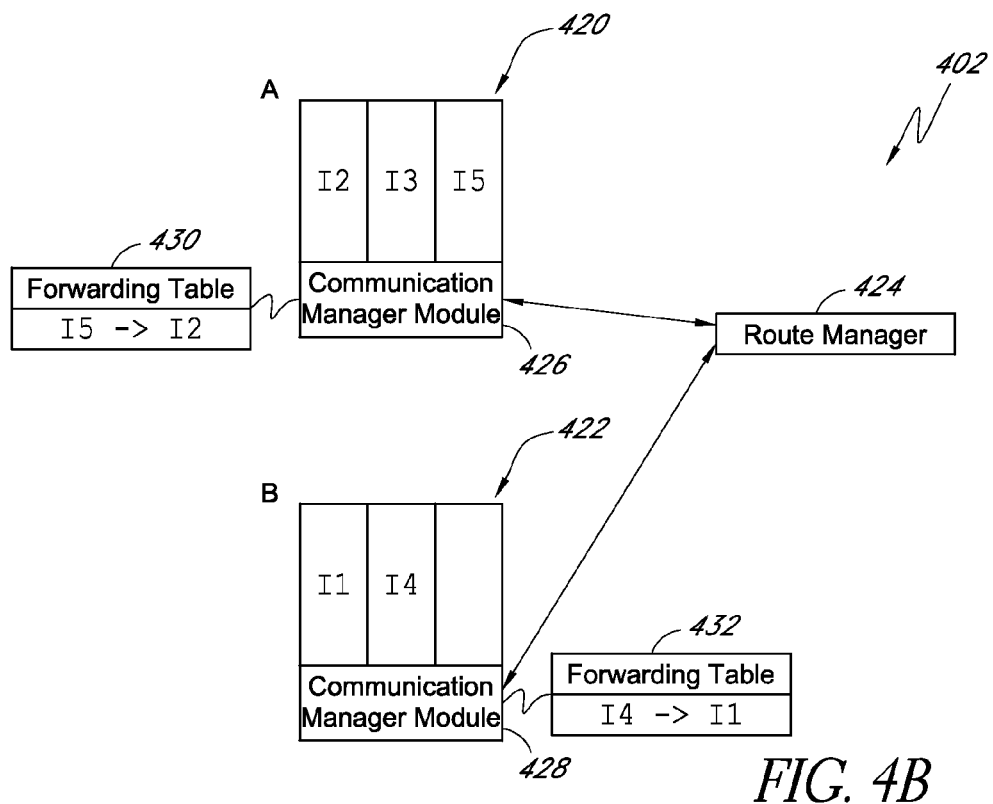

FIGS. 4A and 4B illustrate a virtual network 401 and corresponding substrate network 402 where substrate routing is independently determined from virtual routing. FIG. 4A illustrates a virtual network including several virtual network components. Virtual computing nodes I4 404 and I5 406 are connected to a logical router 408. The logical router can implement certain of the features described in the logical router 270a, 270b of FIG. 2. The logical router is connected to firewalls I1 410 and I2 412. The logical router is configured to direct traffic from I5 to I2 and I4 to I2, as would be the case if I2 were a backup firewall. The forwarding table associated with logical router 409 reflects this traffic configuration. I1 and I2 are connected to a second router 414. The second router is connected to another virtual computing node, I3 415.

Thus, based on the topology and associated forwarding table of the virtual network 401, traffic from I4 and I5 to I3 passed through I2.

Meanwhile, FIG. 4B illustrates an example topology of the substrate network 402 associated with the virtual network 401. The substrate network includes computing node A 420, computing node B, and a Route Manager 424. Substrate nodes A and B are each associated with a Communication Manager 426, 428. Node A is simulating the operation of virtual components I2, I3 and I5 while Node B is simulating the operation of virtual components on I1 and I4 on their respective virtual machines. The Route Manager can then use information regarding the assignments of virtual components to computing nodes to optimize or otherwise adjust routing tables for the substrate network. The Route Manager can receive such information from the Communication Managers and/or the System Manager. For example, assuming I1 and I2 are identical virtual firewalls, the Route Manager can determine that because I5 and I2 are located on the same computing node, while I4 and I1 are located on the other node, virtual network traffic can be routed from I5 to I2 and from I4 to I1 without leaving the respective computing node, thus reducing traffic on the network. Such a configuration is reflected in the illustrated forwarding tables 430, 432 associated with the Communication Managers. Thus, routes on the substrate network can be determined independently of virtual network routes.

In some embodiments, the Route Manager 424 or System Manager can optimize or otherwise improve network traffic using other techniques. For example, with reference to FIGS. 4A and 4B, another instance of I3 can be operated on node B 422, in addition to the instance of I3 on node A. Thus, virtual network traffic from I5-I2-I3 and I4-I1-I3 can remain on the same computing node without having to send traffic between computing nodes A and B. In one embodiment, substrate traffic can be optimized or otherwise improved without having different forwarding entries on the substrate and the virtual network. For example, with reference to FIG. 4B, I4 can be moved from computing node B 422 to node A 420, thus allowing virtual traffic from I5 and I4 to I2 to remain on the same computing node. In this way, a user monitoring traffic on logical router 408 would see that traffic is flowing according the forwarding table in the router, that is, substrate routing is transparent to the user. Other techniques for optimizing traffic by changing the association of virtual components with virtual machines and/or duplicating components can also be used.

In some situations, it can be desired that substrate routes reflect routes specified in the virtual table. For example, the virtual network user can wish to control how traffic is routed in the substrate network. However, rather than giving the user access to the substrate network, which could put other users at risk or otherwise compromise security, a data center operator can propagate network configuration or virtual network characteristics specified by the user for the virtual network to the substrate network. This propagated data can be used in generating routing paths in the substrate network, thus allowing the user to affect substrate routing without exposing the substrate layer to the user.

Route Selection on Overlay/Virtual Network

Figure 5A:
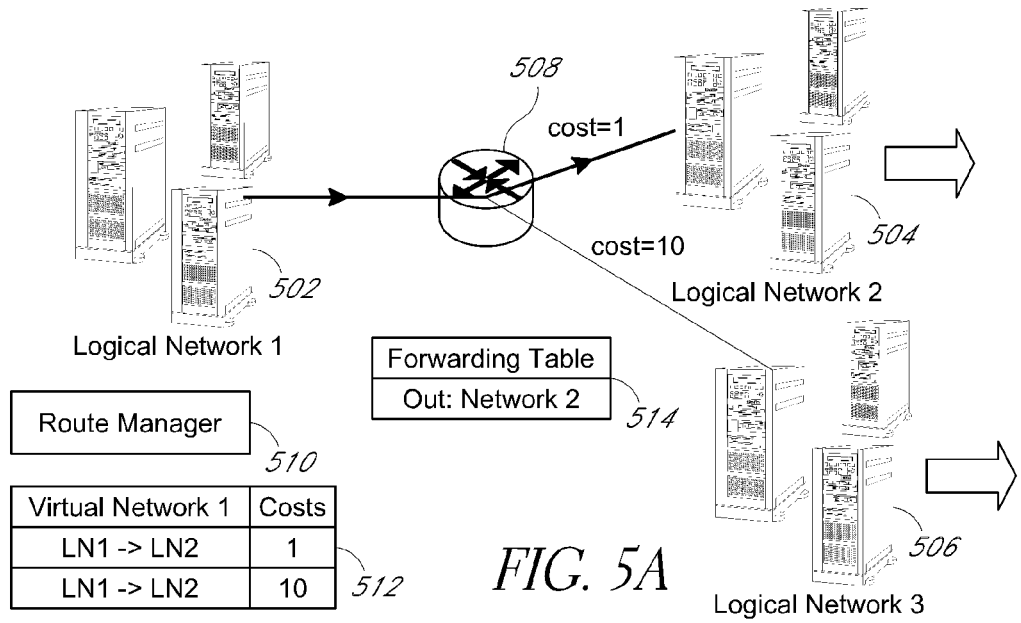
FIGS. 5A and 5B illustrate a virtual route selection propagated to the substrate network.
Figure 5B:
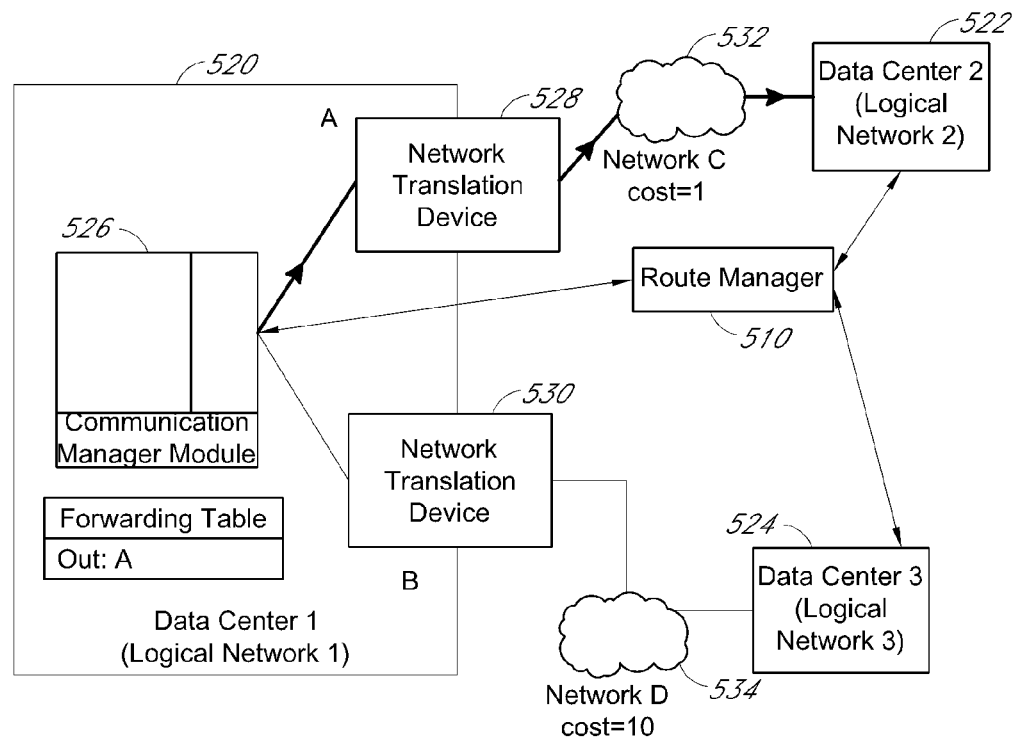

FIGS. 5A and 5B illustrate a virtual route selection propagated to the substrate network. FIG. 5A illustrates a virtual network topology where logical network 1 (LN1) 502 is connected to logical network 2 (LN2) 504 and logical network 3 (LN3) 506 by a logical router 508. The current preferred routing path specified by the user is from LN1 to LN2.

A user may wish to specify a route for various reasons. For example, routing costs through LN2 can be cheaper than LN3, such as when LN2 and LN3 are in different locations with different ISPs and one ISP charges lower rates than another. In another example, LN3 can be a backup virtual network for LN2, and used only in some situations, such as for handling overflow from LN2.

Referring back to FIG. 5A, the user can specify preferred routes through the virtual network and/or characteristics or costs associated with the virtual components, such as monetary costs, packet loss rates, reliability rate, and/or other metrics. These characteristics can be assigned to the virtual components, such as the virtual computing nodes, node links, logical routers/switches or the like. The Route Manager 510 can then determine routing tables 512 and/or forwarding tables 514 for the virtual network.

FIG. 5B illustrates an example of a substrate route that can correspond to the virtual route in FIG. 5A. In the figure, there are three data centers 520, 522, 524 corresponding to the logical networks 502, 504, 506 of FIG. 5A. In data center 1 (DC1), a computing node 526 is connected to a network translation device A (NTD A) 528 and a network translation device B (NTD B) 530. The network translation devices are connected to external networks C 532 and D 534, respectively.

The network translation devices can serve as a gateway or entry/exit point into the virtual network. In some embodiments, the network translation devices can translate between a first addressing protocol and a second addressing protocol. For example, if the virtual network is using IPv6 and the external networks are using IPv4, the network translation devices can translate from one addressing protocol to the other for traffic in either direction. In one embodiment, users connect from their private networks to the data centers via a VPN or other connection to a network translation device, which translates and/or filters the traffic between networks.

Referring back to FIG. 5B, network C 532 connects data center 2 522 to NTD A 528. Network D 534 connects data center 3 524 to NTD B 530. The Route Manager module 510 is in communication with data center 1 520, data center 2 522, and data center 3 524, particularly with the Communication Manager for the computing node 526.

From information associated with the virtual network, the Route Manager 510 can determine that the user wants to route traffic from LN1 to LN2. The Route Manager can then "favor" substrate routes associated with the LN1 to LN2 virtual path. For example, the Route Manager can specify a low routing cost (e.g. cost 1) for communications, such as data packets, travelling on Network C relative to Network D (e.g. cost 10) such that during route determination, routes through Network C are favored. In one embodiment, the Route Manager can apply a coefficient to stored substrate costs in order to favor one route over another. In another example, explicit routing paths can be set up corresponding to the virtual route. The Route Manager can identify routes in its routing table and communicate those routes with one or more Communication Managers.

Referring back to FIG. 5B, when the computing node 526 receives or generates a packet destined for LN2 or a network reachable from LN2, the computing node can be configured by the Route Manager to send packets through NTD A 528 as it lies on the route including network C 532.

By propagating virtual network configuration data to the substrate, and using that configuration data in substrate route calculation, a mechanism is provided for a virtual network user to affect substrate routing. In some embodiments, the virtual configuration data can be used in determining association of the virtual components with the substrate components. For example, components of the same virtual network can be associated with the same substrate computing node or on computing nodes connected to the same switch in order to minimize or otherwise improve substrate network traffic. Configuration data can also be provided the other way and, in some embodiments, the user and/or virtual network can be provided with additional substrate information, such as characteristics of the underlying associated substrate components (e.g. performance, costs) in order to make more informed routing decisions.

Figure 6:
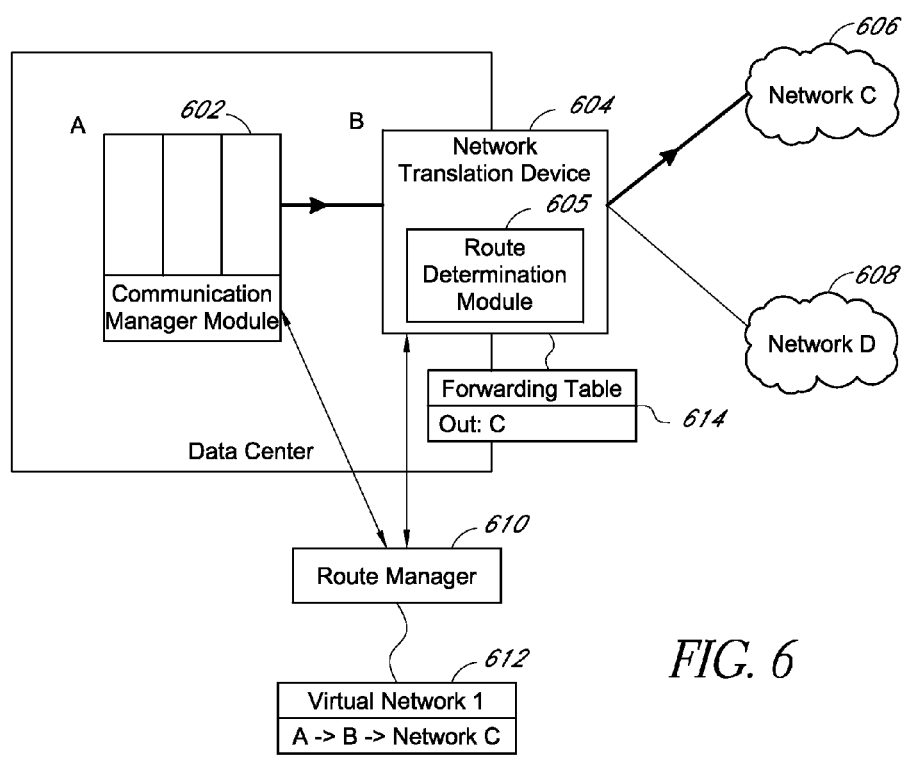
FIG. 6 illustrates an example substrate network wherein a network translation device determines routes into or out of a virtual network.

FIG. 6 illustrates an example substrate network wherein a network translation device determines routes into or out of a virtual network. In FIG. 6, a communication, such as a data packet, leaves computing node A, which is associated with a virtual network, through NTD B 604. The network translation device can include a Route Determination module 605 for determining the packet route. NTD B is connected to network C 606 and network D 608.

In FIG. 6, the Route Manager 610 receives a network configuration or determines that route A-B-C is preferred or has a cheaper cost. The Route Manager can store the route in a routing table 612. The Route Manager can then send forwarding entries to the NTD B 604 that configure it to send traffic through network C 606. NTD B can contain multiple forwarding entries for multiple virtual networks, such that data for one virtual network can be sent through network C, while another virtual network sends data through network D. In some cases, network packets with the same source and/or destination are sent by different networks based on the associated virtual network.

In some embodiments, the substrate component may not have a Communication Manager or a Route Determination module and other ways of coordinating routing can be used. For example, a substrate component, such as an ordinary router or a network translation device, can be set up multiply on separate paths. Using blacklists, network traffic for a particular virtual network can be allowed on one path but blocked on others. The Route Manager can send a control signal or message updating the blacklists to manage the data flow.

In other embodiments, substrate components can implement IP aliasing, where, for example, "fast" path packets use one set of IP addresses, while "slow" path packets use another set of IP addresses. When the substrate component receives the packet, it can determine which path to use based on the IP address. The Route Manager can send a control signal or message to assign IP addresses to the components based on the type of traffic handled.

Other ways of differentiating how packets are handled by substrate components include: tagging of packets, such as by Multiprotocol Label Switching (MPLS); Media Access Control (MAC) stacking where a packet could have multiple MAC addresses, the first MAC address for a substrate component, such as a switch, and a second MAC address for a next component either on the "fast" or the "slow" path; and using Network Address Translation (NAT) devices on both ends of a network in order to redirect traffic into the network, such as by spoofing or altering an destination address for an incoming packing and/or altering an the source address of an outgoing packet. In some embodiments, the Route Manager generates control signals or messages for coordinating traffic on the substrate network for the various techniques described above.

Virtual Network Route Selection Process

Figure 7A:
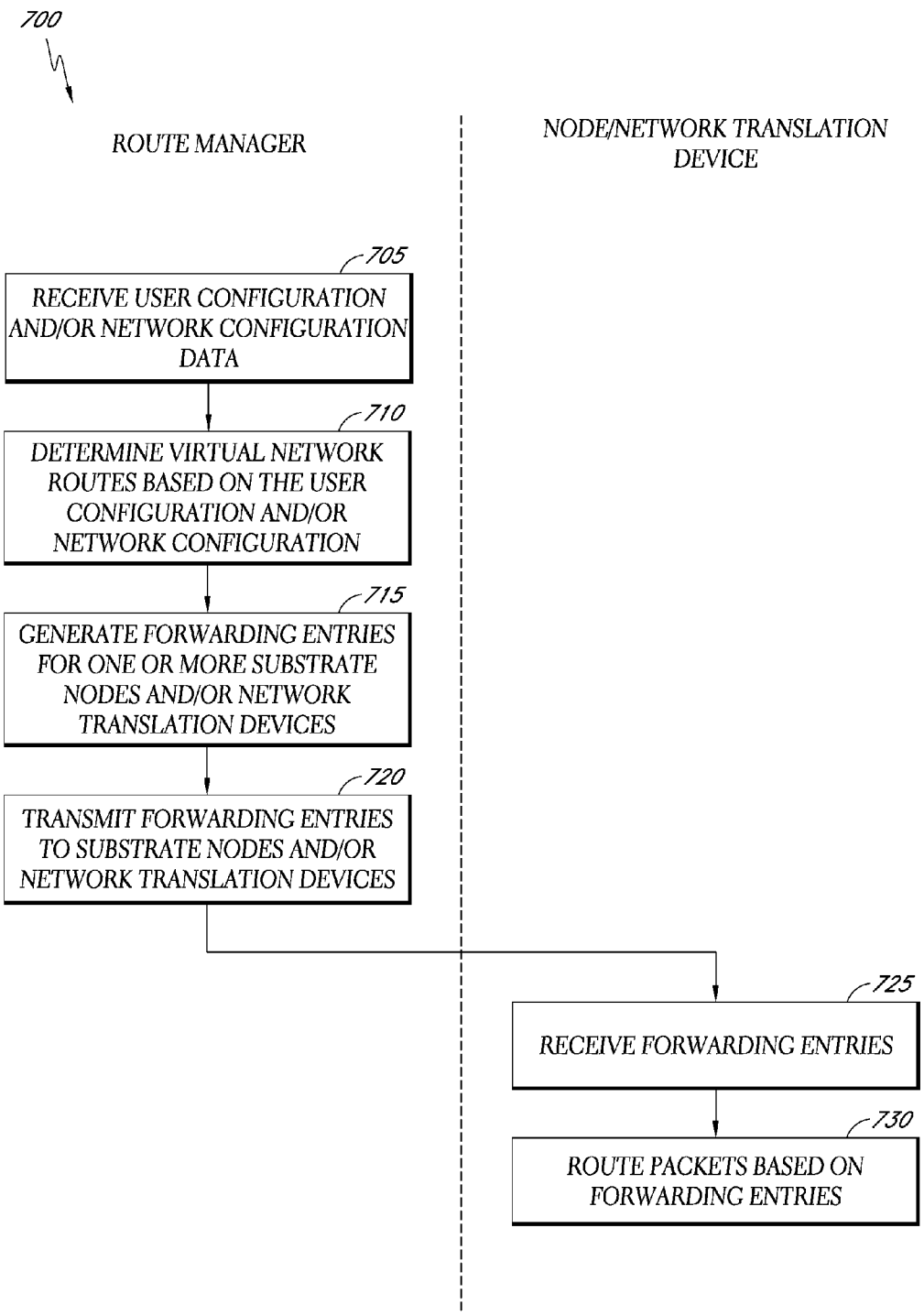
FIG. 7A illustrates a flow diagram for a process of propagating virtual routes to a substrate network.

FIG. 7A illustrates a flow diagram for a process 700 of propagating virtual routes to a substrate network usable in the example networks described above. The virtual routes can be based on network configuration data provided by a virtual network user, such as costs, component characteristics, preferred routes, and/or the like.

At block 705, the Route Manager module receives user configuration and/or network configuration data, such as, for example, policy based routing decisions made by the user. In some embodiments, a user interface is provided, allowing a user to specify configuration data. The Route Manager can receive the configuration data from a data store, for example, if user configuration and/or network configuration data are stored on the data store after being received on the user interface or otherwise generated. In some embodiments, the configuration data can include explicit routing paths through the virtual network. In some embodiments, the configuration data can specify associated costs for traversing components of the virtual network, such as links and/or nodes. These costs can be based on monetary costs, packet loss rates, reliability rate, and/or other metrics. These costs can be provided by the user to configure the virtual network provided by the data center operator. However, costs and other network configuration data can come from the data center operator themselves in addition to or instead of from the user. For example, the data center operator can use the virtual network to provide feedback to the user on routing costs, such as by associating monetary use costs for the substrate computing nodes and/or components. In one example, the data center operator can specify a high cost for a high speed network link or high powered computing node so that the virtual network user can take into account that cost in configuring the virtual network.

At block 710, the Route Manager module determines virtual network routes based on the user configuration and/or network configuration data. In some embodiments, routing protocols or the route determination algorithms of the routing protocols, such as BGP, OSPF, RIP, EIGRP or the like, can be used to determine virtual routes.

At block 715, the Route Manager determines one or more forwarding entries for substrate network components, such as computing nodes, network translation devices, or the like. As the Route Manager can determine routing paths and propagate routing decisions to the substrate components, the Route Manager can coordinate routing within a data center and/or between multiple data centers.

At block 720, the Route Manager transmits the forwarding entries to the substrate components. At block 725, the substrate component receives the forwarding entries. The substrate network components can store the forwarding entries in FIB tables or similar structures. Generally, a Communication Manager on the substrate component receives and processes the forwarding entry and manages communications of the substrate component.

However, as discussed above, network traffic can also be coordinated for substrate components without a Communication Manager using instead, for example, a NAT device or the like. In some embodiments, the Route Manager can send blacklist updates, manage tagging of the packets, generate stacked MAC addresses, or the like.

At block 730, the substrate components route packets received or generated according to the stored forwarding entries. Generally, a Communication Manager on the substrate component manages the packet routing and refers to the forwarding entries to make forwarding decisions.

Substrate Network Route Selection Process

Figure 7B:
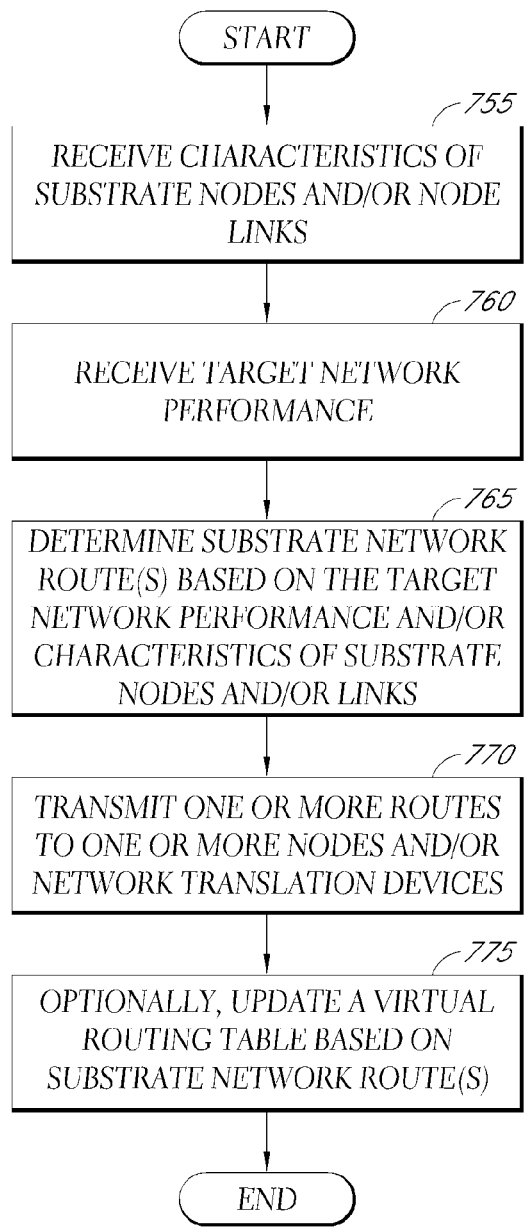
FIG. 7B illustrates a flow-diagram for a process of determining substrate routing based on target performance characteristics of the associated virtual network.

FIG. 7B illustrates a flow-diagram for a process 750 for determining substrate routing based on target performance characteristics of the associated virtual network usable in the example networks described above. In some instances, the Route Manager can optionally generate a virtual routing table for the virtual network before determining substrate routing. The virtual routing table can be used to determine virtual routing paths, allowing optimization of network traffic by selective association of the virtual network components with substrate computing nodes, such as by taking into account physical location and virtual network traffic patterns. However, generation of the virtual routing table is not necessary as the substrate routes can be determined independently of the virtual routes, as will be described below. In addition, user configuration and/or network configuration data provided by the user can be used to describe the virtual network, without needing to generate a virtual routing table.

At block 755, the Route Manager receives characteristics of the substrate nodes and/or node links. The Route Manager can receive the characteristics data from a data store. In some embodiments, a user interface is provided, allowing a user to specify characteristics data. The characteristics can describe such things as monetary costs, network bandwidth, network security, network latency, network reliability and/or the like. These characteristics can be used in a cost function for determining substrate routing paths. This information can be kept by the Route Manager or data source accessible by the Route Manager.

At block 760, the Route Manager receives a target network performance for the virtual network. The target performance can be based on a purchased service level by the user, user history, security data or the like. For example, a service level purchased by a user can have minimum bandwidth, latency, or quality of service requirements. In another example, a user can be a new customer with an unknown payment history such that the user is provisioned on a "slow" virtual network in order to minimize incurred expenses in case the user fails to pay. In another example, a user identified as carrying dangerous or prohibited traffic, such as viruses, spam or the like, can be quarantined to particular substrate components. During quarantine, the virtual network components can be assigned to specialized substrate components with more robust security features. For example, the substrate components can have additional monitoring functionally, such as a deep-packet scanning ability, or have limited connectivity from the rest of the substrate network.

At block 765, the Route Manager determines substrate network routes based on the target network performance and/or characteristics of the substrate nodes and/or links. In one embodiment, the Route Manager can use the characteristic data in a cost function for determining routes. Which characteristic to use or what level of service to provide can be determined by the performance criteria or target performance. For example, for a "fast" route, the Route Manager can use bandwidth and/or latency data for the substrate network to generate routes that minimize latency, maximize available bandwidth, and/or otherwise improve network performance.

The Route Manager can re-determine routes as needed based on changes in the network, the configuration data, and/or the performance level. For example, if a user has purchased N gigabits of "fast" routing but has reached the limit, the Route Manager can generate new routes and shift the user to "slow" routing.

At block 770, the Route Manager transmits forwarding entries for one or more routes to one or more nodes and/or network translation devices. In some embodiments, the Route Manager determines forwarding entries for the substrate components and sends those forwarding entries to the substrate components on the path. In some embodiments, the Route Manager can send blacklist updates, manage tagging of data packets, and/or generate stacked MAC addresses.

At block 775, the Route Manager can optionally update the virtual routing table based on substrate network routes. By changing the virtual network routing table based on the substrate routes, the virtual network can stay logically consistent with the behavior of the substrate network. Thus, users won't necessarily be confused by discrepancies in the virtual routing.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A routing system for determining a routing path for network data packets through a substrate network associated with a virtual network having virtual components, the routing system comprising:
a computing interface for receiving user-specified characteristics of virtual routes of a virtual network; and
a route manager comprising one or more computing devices, the route manager configured to:
obtain a user-specified virtual route characteristic from the computing interface, the user-specified virtual route characteristic associated with a virtual route identifying one or more virtual components of the virtual network;
associate the user-specified virtual route characteristic with at least one computing node, wherein the at least one computing node is configured to simulate a virtual component identified in the virtual route;
generate a substrate routing table based at least partly on a topology of the substrate network and the user-specified virtual route characteristic associated with the at least one computing node, the substrate routing table comprising one or more substrate network addresses, the substrate routing table identifying routes through the substrate network;
generate one or more forwarding entries for the one or more nodes of the substrate network, the one or more forwarding entries reflecting a substrate route corresponding to an identified route in the substrate routing table; and
communicate the one or more forwarding entries to the at least one computing node.

2. The routing system of claim 1, wherein the user-specified virtual route characteristic comprise at least one of a routing cost, monetary cost, a packet loss rate and a communication reliability rate.

3. The routing system of claim 1, wherein the user-specified virtual route characteristic comprise user-preferred routing paths between virtual components of the virtual network.

4. The routing system of claim 1, wherein the at least one computing node of the substrate network comprises one or more computing devices connected to one or more communications medium.

5. The routing system of claim 4, wherein the user-specified virtual route characteristic comprise routing costs between nodes of the substrate network for network traffic over the communications medium.

6. The routing system of claim 4, wherein the communications medium comprises at least one of a wired and wireless connection.

7. The routing system of claim 1, wherein generating the substrate routing table comprises executing a routing protocol to populate the substrate routing table at least partially based on the user-specified virtual route characteristic associated with the at least one computing node.

8. The routing system of claim 1, wherein the at least one computing node is associated with multiple virtual characteristics corresponding to multiple virtual networks.

9. The routing system of claim 1, wherein the at least one computing node operates virtualization software capable of simulating multiple virtual components on the same node.

10. The routing system of claim 1, wherein each virtual component simulated on the at least one computing node is associated with a separate set of forwarding entries.

11. The routing system of claim 1, wherein the virtual network spans over multiple computing nodes in multiple data centers.

12. The routing system of claim 1, wherein the route manager directs routing for a plurality of computing nodes of the substrate network.

13. The routing system of claim 1, wherein the route manager directs routing for a single computing node of the substrate network, each computing node having an associated route manager.

14. The routing system of claim 13, wherein the route manager operates on the at least one computing node.

15. A computer-implemented method for determining a routing path for network data packets through a substrate network associated with an overlay network, the method comprising:

by a computing system that comprises one or more computing devices:

in a substrate network comprising a plurality of nodes and an overlay network at least partially simulated by the substrate network, receiving network configuration data specified by a user associated with the overlay network, the network configuration data supplementary to data included in network data packets, the network configuration data specifying an overlay network characteristic that affects routing behavior of one or more overlay network components;

in response to receiving the network configuration data, automatically associating the network configuration data with one or more substrate nodes associated with the one or more overlay network components; and adjusting routing in the substrate network based at least in part on the network configuration data associated with the one or more substrate nodes.

16. The method of claim 15, wherein the overlay network characteristic specified by the network configuration data comprises at least one of a routing cost, monetary cost, a packet loss rate and a communication reliability rate.

17. A computer-implemented method for determining a routing path for network data packets through a substrate network associated with a virtual network, the method comprising:

by a computing system that comprises one or more computing devices:

receiving network configuration data supplementary to data included in network data packets from one of a plurality of virtual network customers, the network configuration data comprising a characteristic of one or more virtual components of the virtual network; and in response to receiving the network configuration data, automatically:

associating components of the virtual network with one or more nodes of a substrate network, the one or more nodes of the substrate network capable of simulating the operation of one or more components of the virtual network;

associating the network configuration data with the one or more substrate nodes associated with the one or more virtual components of the virtual network; and generating substrate routes through the substrate network at least partially based on the network configuration data associated with the substrate nodes.

18. The method of claim 17, wherein the network configuration data comprise a cost function specified by a user for the virtual network.

19. The method of claim 17, wherein the network configuration data comprise routing metrics between virtual components specified by a user.

20. The method of claim 19, wherein the routing metrics comprise at least one of a routing cost, a monetary cost, a packet loss rate and a communication reliability rate.

21. The method of claim 17, wherein the network configuration data corresponds to metrics for traversing the underlying substrate network.

22. The method of claim 17, wherein generating substrate routes comprises identifying routes by using the network configuration data associated with the substrate node as input to a cost function.

23. The method of claim 17, wherein the network configuration data comprises routing costs and topology data for the substrate network and the generated virtual routes minimize the network traffic costs for the underlying substrate network.

24. Non-transitory computer-readable storage medium having stored thereon instructions that, when executed, direct a computing system to:

receive a user-specified characteristic of a virtual route from one of a plurality of virtual network users, the user-specified characteristic identifying a source and a destination component of a virtual network, the virtual network associated with a substrate network;

associate the user-specified characteristic of the virtual route with at least a first substrate node associated with the source virtual component;

identify a substrate route from the first substrate node to a second substrate node, the substrate route at least partially based on the user-specified characteristic associated with the first substrate node; and generate a control message for the first substrate node, the control message configured to direct network packets associated with traffic from the source component to the destination component through the substrate route from the first node to the second node.

25. The non-transitory computer-readable storage medium of claim 24, wherein the virtual network comprises an overlay network over the substrate network.

26. The non-transitory computer-readable storage medium of claim 24, wherein the user-specified characteristic of the virtual route comprises user-defined costs associated with the virtual route.

27. The non-transitory computer-readable storage medium of claim 24, wherein the control message comprises at least one of a forwarding entry, a blacklist update, packet tagging data and MAC stacking data.

28. The non-transitory computer-readable storage medium of claim 24, the instructions further directing the computing system to:

transfer one of the source component and the destination component from the second node to the first node, the source and destination components simulated on the same node after the transfer in order to reduce network traffic over the substrate network between the first node and the second node.

* * * * *